United States Patent [19]

Jüptner et al.

[11] Patent Number: 4,667,080
[45] Date of Patent: May 19, 1987

[54] DEVICE FOR PROCESSING WORKPIECES USING AN ENERGY BEAM OF HIGH POWER DENSITY, IN PARTICULAR A LASER BEAM FROM A $CO_2$ LASER

[75] Inventors: Werner P.-O. Jüptner, Ritterhude; Rüdiger G. R. V. Rothe, Bremen; Gerd K.-H. Sepold, Bad Zwischenahn, all of Fed. Rep. of Germany

[73] Assignee: Bias Forschungs- und Entwicklungslabor fur Angewandte Strahltechnik, Bremen, Fed. Rep. of Germany

[21] Appl. No.: 710,807

[22] Filed: Mar. 12, 1985

[30] Foreign Application Priority Data

Mar. 26, 1984 [DE]  Fed. Rep. of Germany ....... 3411126

[51] Int. Cl.$^4$ ............................................. B23K 26/06
[52] U.S. Cl. ......................... 219/121 LQ; 219/121 L
[58] Field of Search ................. 219/121 LP, 121 LQ, 219/121 L, 121 LM, 121 LR; 350/619, 631; 128/303.1, 395–398

[56] References Cited

U.S. PATENT DOCUMENTS

3,865,113 2/1975 Sharon et al. .................... 128/303.1
3,906,953 9/1975 Wallace et al. ................... 128/303.1
4,141,362 2/1979 Wurster .......................... 128/303.1

*Primary Examiner*—C. L. Albritton
*Attorney, Agent, or Firm*—Sughrue, Mion, Zinn, Macpeak & Seas

[57] ABSTRACT

Laser processing devices consist of process optics (25) for converting the laser beam, these optics being connected by means of a connection element (protection tube 24) to a laser source, for example a $CO_2$ laser 20. Depending on the process to be carried out, an appropriate process adaptor (28) has to be associated with the process optics (25). In order to be able to use a laser processing device as economically as possible, efforts are made to use the laser processing device both for cutting and welding and also for surface treatment, using as little conversion work as possible. In order to simplify this conversion process, the invention proposes providing the process optics (25) with universal connections (53; 66), by means of which the process adaptors (28) and/or mirrors (deflection mirror 44; focusing mirror 45) can be fastened to the casing (29) of the process optics (25) without any noticeable fitting and positioning requirements. By this means, the same casing (29) can be used for all the conceivable types of processing.

21 Claims, 12 Drawing Figures

DEVICE FOR PROCESSING WORKPIECES USING AN ENERGY BEAM OF HIGH POWER DENSITY, IN PARTICULAR A LASER BEAM FROM A $CO_2$ LASER

The invention concerns a device for processing workpieces by means of an energy beam of high power density, in particular a laser beam from a $CO_2$ laser, as described in the preamble to claim 1.

The laser processing device considered here is a relatively high-value machine. It is therefore desirable to use the same basic unit for several different types of process. For this purpose, a process adaptor corresponding to the processing operation to be performed is associated in each case with the laser processing device. Using the adaptor, it is, for example, possible to carry out welding work, cutting work or surface treatment work using one basic machine.

In addition, the laser processing device should be adaptable to different workpieces or workpiece attitudes, i.e. it should, for example, be able to operate with either a horizontally or a vertically directed laser beam. For this purpose, the optics influencing the laser beam, and particularly the process optics, must be adaptable to the given operating conditions.

Known devices of this type permit adaption to the process to be carried out and to the given circumstances only at the cost of substantial conversion work or do not permit it at all.

Finally, particularly in the case of devices which are often used for welding, cleaning is necessary from time to time. This particularly affects the process optics located near the workpiece, these optics being subjected to substantial adverse effects due to smoke, liquid metal droplets or the like. The optical parts of the process optics, in particular, i.e. the deflection and focusing mirrors, require intensive maintenance in order to secure the performance capability of the laser. For this reason, it must be possible to remove the mirrors from the process optics casing. The process optics of previously known laser processing devices only permit expensive mirror dismantling. During the subsequent assembly of the cleaned mirrors, extensive readjustment of the mirrors is generally required.

Seen from these points of view, the object of the invention is to produce a device, in particular process optics, which can be universally applied in an economical manner and is easy to maintain.

The invention achieves this object by means of the characterising features of claim 1. This solution achieves the result that different units, for example cutting adaptors, welding adaptors or alignment aids and also the mirrors necessary for beam deflection or beam focusing, can be rapidly fastened and accurately positioned in the casing of the process optics because these parts can be easily dismantled and assembled by means of their universal connections.

It is desirable that the universal connections on the process optics at those openings in the casing to which various optional designs of adaptors (processing adaptors, etc.) have to be attached should have approximately equal dimensions. On the other hand, those openings in the casing of the process optics to which, for technical reasons, welding heads, cutting heads, etc. should not be connected, are equipped with differently dimensioned universal connections. This ensures, on the one hand, that the adaptors provided for different processes can be easily exchanged on the process optics but, on the other hand, cannot be connected to incorrect openings in the casing, thus avoiding functional disturbances to the laser processing device.

In a particularly advantageous embodiment form of the invention, the universal connections consist of two parts, i.e. a closing part located on the outside of the process optics casing and a second, correspondingly designed connection part in the end region of the connecting elements or adaptors to be connected to the process optics. The last-mentioned connection part of the universal connection consists, in the simplest manner, of a peripheral annular groove located at a distance from an end surface of the unit directed towards the casing. The other part of the universal connection on the casing is designed to suit the grooves or groove segments on the units, namely as a set consisting of at least two clamps. These are located in a releaseable manner and evenly distributed at the edge of the openings in the casing and can, in fact, be screwed on from outside. The clamps are designed L-shaped with a protrusion pointing towards the centre of the opening, the protrusion being dimensioned to correspond with the annular groove or the groove segments in the units.

The universal connections, designed, for example, as described above, permit simple connection of the process optics to the corresponding supply elements or adaptors, the latter being simply pushed between the clamps which have been slightly loosened relative to the casing. In order to change the adaptors or supply elements, the clamps therefore only need to be loosened and retightened after another unit has been applied to the respective opening in the casing. The units are, therefore, only held to the casing by frictional or force connection.

In order to deal with the case where more openings are provided in the process optics casing than are necessary to accept all the units necessary for one operational set of laser processing equipment, each of the unused openings in the casing is covered by a removable blind flange in order to protect the inside of the casing and the mirrors located there. The blind flange can be connected to the casing by means of a universal connection which serves to fasten the adaptors or supply elements.

The invention also proposes, in the case of a casing whose open ends are closed by covers and a mirror is located on each cover, that the cover should also be releasably connected to the casing by means of a universal connection. This universal connection can, in principle, have the same construction as the universal connections serving to fasten the adaptors or the like to the casing, but should, however, have dimensions matching the covers.

In order to position the cover with the mirror relative to the casing and to prevent it from rotating, the invention provides for an anti-rotation device. This preferably consists of two opposite (sprung) ball catches. The latter are located in one of the parts to be mutually centered, for example a cover, and they each interact with an associated bore or the like in the other part, for example in the casing, into which bore the ball of the ball catch springs.

The assembly of the mirrors removed from the process optics for inspection or cleaning purposes is facilitated by such ball catches because, once the mirror has been aligned, it can be fitted accurately in the required position relative to its longitudinal axis using the catches.

Five embodiment examples of the laser processing device in accordance with the invention are described below in more detail using the drawing.

In this.

Figure 1:
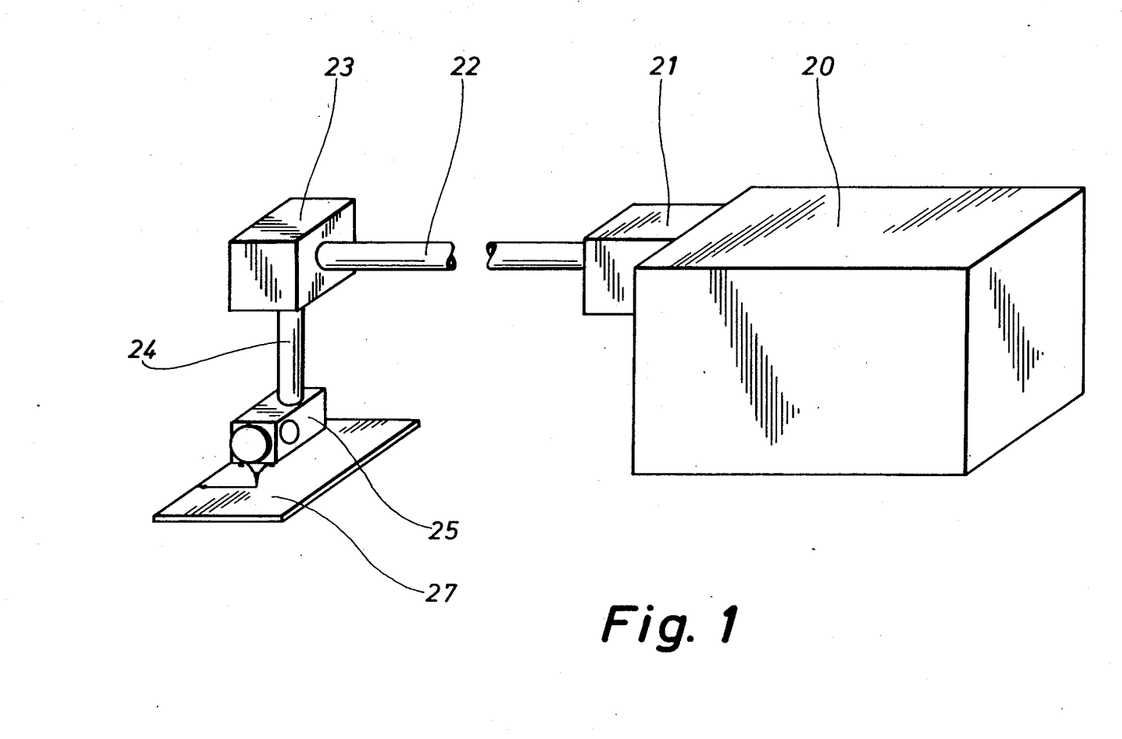
FIG. 1 shows a diagrammatic representation of a side view of a laser processing device.

FIG. 1 illustrates the construction, in principle, of the laser processing device in accordance with the invention. The energy source used is a high-power laser, i.e. a $CO_2$ laser 20. A telescope 21 is located at the beam outlet of the $CO_2$ laser 20 and is connected to a deflection mirror 23 by means of a (horizontal) protection tube 22. The deflection mirror 23 deflects the laser beam arriving through the protection tube 22 from the horizontal into a vertical beam direction. The laser beam finally passes from deflection mirror 23 via a further (vertical) protection tube 24 to process optics 25. The process optics 25 in this embodiment example are so designed that the laser beam is deflected twice within the optics—from a vertical beam direction into a horizontal beam direction and from the latter, in turn, into a laser beam direction at outlet from the process optics 25, which direction is at right angles to the horizontal beam direction.

Figure 2:
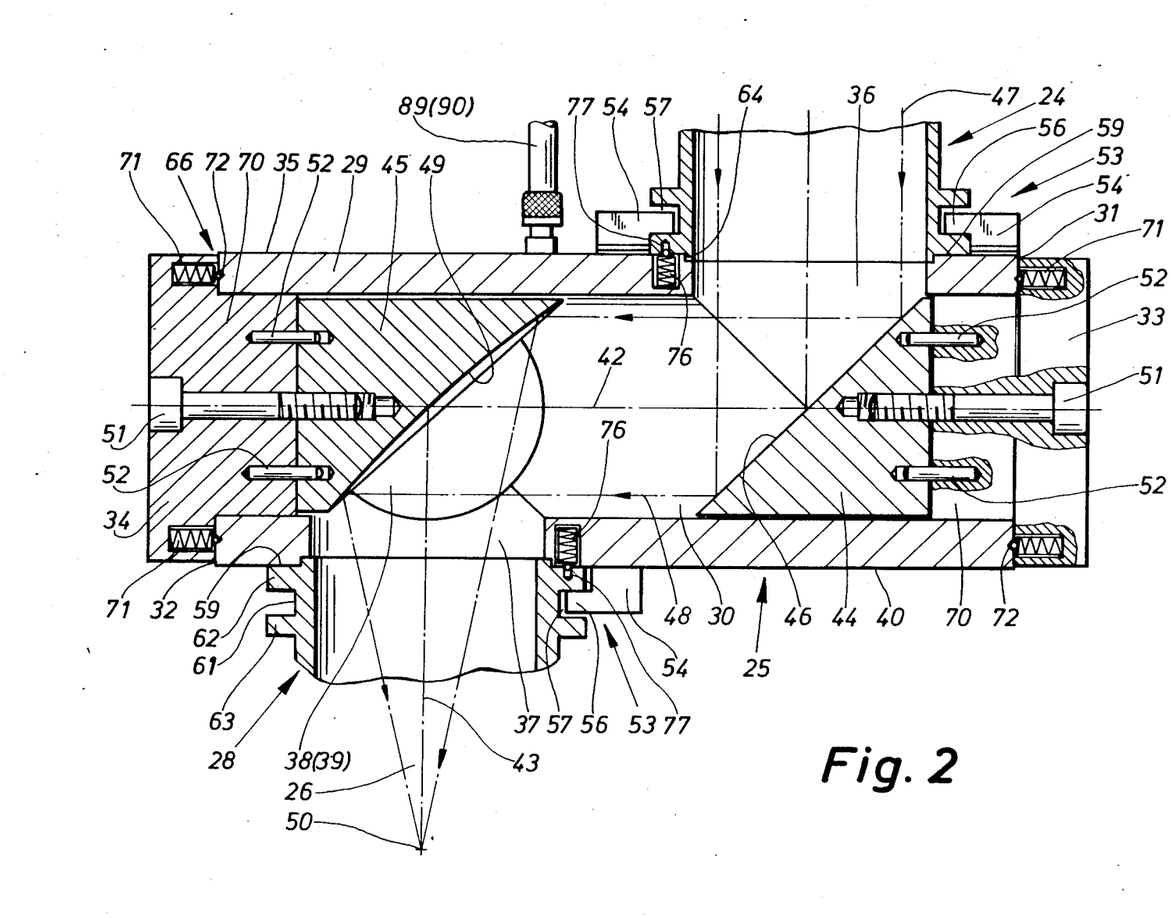
FIG. 2 shows a vertical longitudinal section through a process optics system.

As is also shown in FIG. 2, the laser beam—in this embodiment example—leaves the process optics 25 in a vertical beam direction and, in fact, as a focused laser beam 26. Using a focused laser beam 26 of this type, both cutting and welding work can be carried out on a workpiece 27 (FIG. 1). The process adaptor 28 located at the outlet end beneath the process optics 25 (and only partially shown in FIG. 2) must be correspondingly designed, i.e. either as a welding adaptor or as a cutting adaptor.

The construction of the process optics 25 is shown in detail in FIG. 2. This shows that the optics 25 are provided with a horizontal casing 29 which is oblong in longitudinal section and square in cross-section. A circular through hole 30 in the longtiduinal direction is located in the centre of the casing 29. The opposing ends 31 and 32 of the casing 29 are each closed by a flange-type design of cover, 33 and 34 respectively.

In this embodiment example, the casing 29 has a total of four openings in its walls. In the end region of the casing 29 directed towards the end 31, there is, located in an upper wall 35 of the casing, an inlet opening 36 for the laser beam arriving from the deflection mirror 23. The other three openings, i.e. the outlet openings 37, 38 and 39 are located in the opposite end region of the casing 29. Whereas the outlet opening 37 is located in a bottom wall 40 of the casing 29, the other two outlet openings 38 and 39 are located in two opposite side walls of the casing 29. The axes of all three outlet openings 37, 38 and 39 are located in a common plane normal to a longitudinal axis 42 of the process optics 25, in which is also located a longitudinal central axis 43 of the focused laser beam 26.

The mirrors necessary for deflecting the laser beam are located in the casing 29 of the process optics 25. In the present embodiment example, a cylindrical deflection mirror 44 and a similarly cylindrical focusing mirror 45 are located in the casing 29. The deflection mirror 44 is associated with the inlet opening 36. It has a plane reflection surface 46 inclined at 45° to the longitudinal axis 42 of the process optics 25. By this means, the deflection mirror 44 deflects the cylindrical laser beam 47 entering vertically through the entry opening 36 in the casing 29 into a horizontal laser beam 48 passing through the casing 29 in the direction of the longitudinal axis 42 of the casing. Because of the 45° inclination of the plane reflection surface 46 of the deflection mirror 44, the laser beam 48 passing in the horizontal direction has approximately the same shape as the laser beam 47 which enters the process optics 25. From the deflection mirror 44, the laser beam 48 passes to the opposite focusing mirror 45, which can be alternatively allocated to one of the outlet openings 37, 38 or 39. The focusing mirror 45 has a parabolic, i.e. concave reflection surface 49. The parabolic reflection surface 49 is also inclined relative to the longitudinal axis 42 of the process optics 25 in such a way that the focusing mirror 45 produces a beam deflection of 90°. By this means, in the relative position of the focusing mirror 45 shown in FIG. 2, the horizontal cylindrical laser beam 48 is deflected back into a vertical direction but, at the same time, is focused to the laser beam 26 by means of the concave curvature of the reflection surface 49 of the focusing mirror 45. In this embodiment example, a focus 50 of the laser beam 26 focused by the focusing mirror 45 in the process optics 25 is located outside the casing 29, in the region, in fact, of the process adaptor 28.

The mirrors (deflection mirror 44; focusing mirror 45) are respectively connected to one of the end covers 33 and 34 of the casing 29. Thus the deflection mirror 44 is connected to the inner end surface of the cover 33 and the focusing mirror 45 is connected to the inner end surface of the cover 34 by means, in each case, of a screw 51 located in the longitudinal axis 42 of the process optics 25, the screw coming from the outer ends of the casing 29. In the present embodiment example, two cylindrical dowels 52 are used, in each case, to position exactly and secure against rotation the deflection mirror 44 and the focusing mirror 45 relative to the respective covers 33 and 34 associated with them.

As may also be seen from FIG. 2, the diameters of the deflection mirror 44 and the focusing mirror 45 are slightly smaller than the cylindrical through hole 30 in the casing 29. This prevents jamming of the mirrors in the casing 29 when they expand due to thermal heating.

Figure 3:
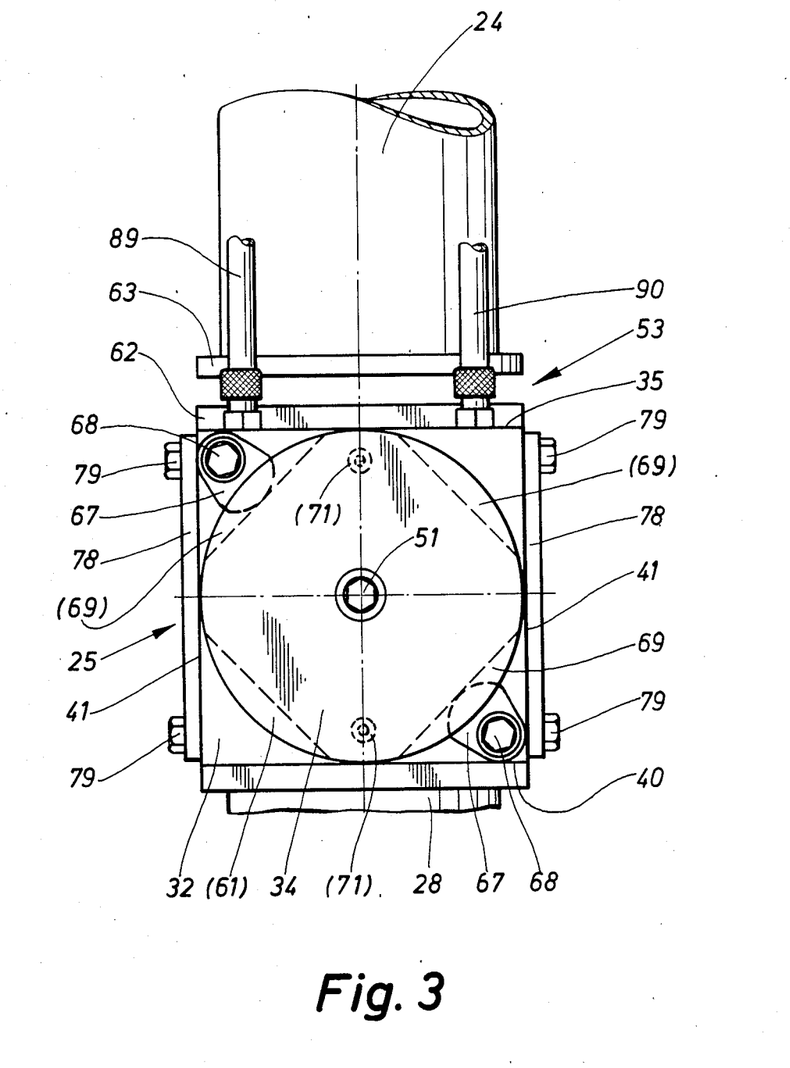
FIG. 3 shows an end view of the process optics shown in FIG. 2.

In the embodiment example of FIGS. 1 to 3, a bottom end of the protection tube 24 is associated with the inlet opening 36 of the casing 29 and the process adaptor 28 is associated with the outlet opening 37 located in the lower wall 40. The protection tube 24 and the process adaptor 28 are each connected to the process optics 25 by means of a universal connection 53. Process adaptors and supply connections can also be connected to the side outlet openings 38 and 39 in the casing 29 by means of a universal connection 53 on the process head 25. The universal connections 53 for the inlet opening 36 and the outlet openings 37, 38 and 39 of the casing 29 are provided with universal connections 53 constructed, in principle, in a similar manner; these connections can also have the same dimensions in the present embodiment example because the diameters of the inlet opening 36 and the outlet openings 37, 38 and 39 are approximately equal.

Figure 5:
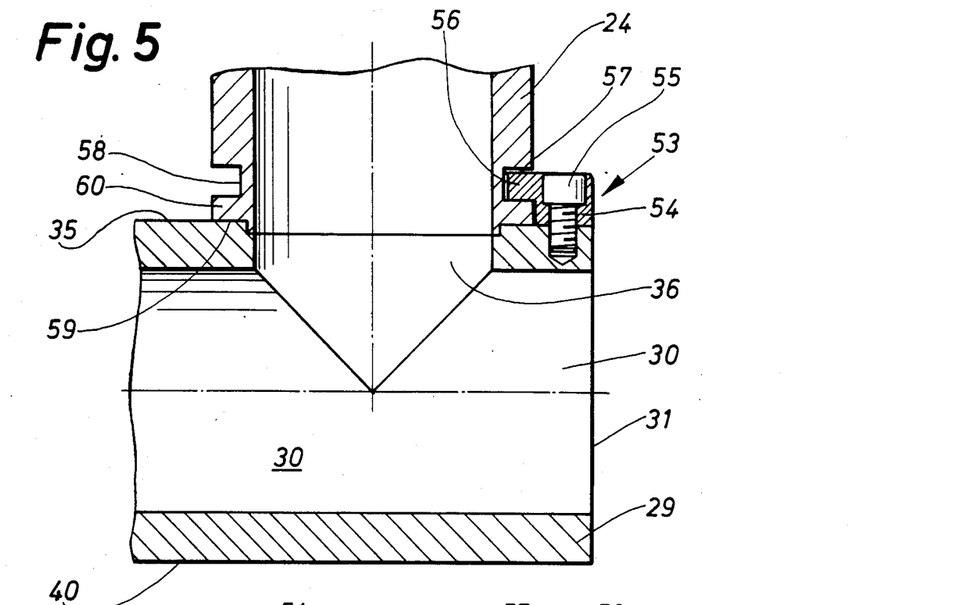
FIG. 5 shows a detail IV, from FIG. 2, of a universal connection in the region of a clamp, to an increased scale.
Figure 6:
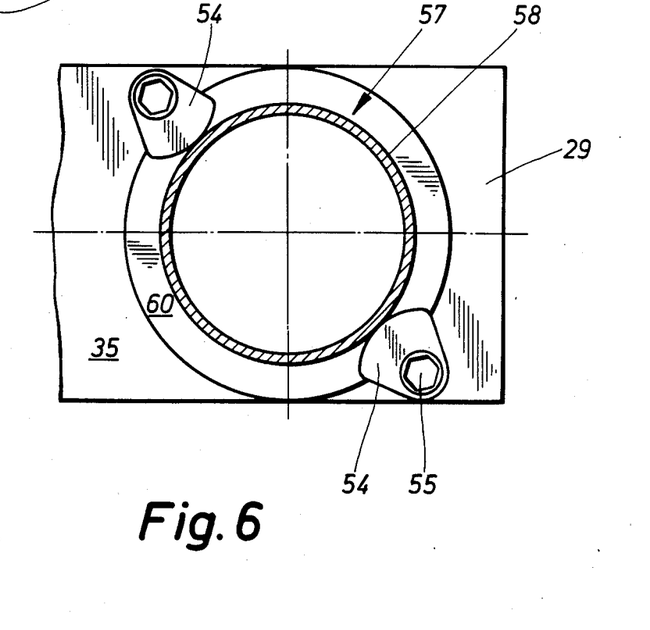
FIG. 6 shows a plan view of the representation shown in FIG. 5.

The construction of a universal connection 53 is given in detail in FIGS. 5 and 6. These show that the universal connection 53 has two clamps 54, each of which is screwed by means of a screw 55 to the upper wall 35 of the casing 29. As shown in FIG. 6, the two clamps 54 are located diagonally opposite to one another with respect to the upper wall 35. Each clamp 54 has an L-shaped cross-section with a protrusion 56 pointing towards the centre of the inlet opening 36. The protrusion 56 is slightly displaced upwards relative to the upper wall 35 of the casing 29 and hence forms a free space 57 between its lower surface and the upper wall 35.

The lower end of the protection tube 24 directed towards the casing 29 has a peripheral annular groove 58 in this embodiment example. This annular groove is located at a small distance from an end wall 59 of the protection tube 24 in contact with the upper wall 35 of the casing 29 and is a turned groove. The dimensions of the annular groove 58 and its distance from the end surface 59 are so selected that, on the one hand, the protrusions 56 of the clamps 54 engage in the annular groove 58 and, on the other hand, the ring 60 remaining between the annular groove 58 and the end wall 59 of the protection tube 24 fills the free space 57 between the protrusions 56 and the upper wall 35. When the clamps 54 are screwed tight onto the casing 29, their protrusions 56 clamp the ring 60 of the protection tube 24 against the casing 29.

Alternatively, an annular groove 61 can also be formed on the protection tube 24 or on the process adaptor 28 by means of two collars 62 and 63 located with a distance between one another on the protection tube 24 or process adaptor 28, as is shown in FIG. 2, for example.

A centering spigot 64 on the end wall 59 of the protection tube 24 can also be seen in FIG. 5. The diameter of this spigot is reduced relative to the external dimensions of the protection tube 24. The centering spigot 64 engages in a matching recess 65 in the upper wall 35 of the casing 29, in the inlet opening 36, in fact. The centering spigot 64 and the recess 65 permit radial centering of the protection tube 24 relative to the casing 29 of the process optics 25.

Using a universal connection 53 constructed in this manner, the connection is released by first loosening the two screws 55 of the clamps sufficiently far for the centering spigot 64 (which should be as short as possible) of the protection tube 24 to be raised out of the recess 65 to such an extent that the protection tube 24 and the process optics 25 can be displaced sideways relative to one another until the protrusion 56 of the clamps 54 comes out of engagement with the annular groove 58. Assembly takes place in the reverse order by first pushing the protection tube 24 to be fitted between the clamps 54, the protrusions 56 of the clamps 54 then coming into engagement with the annular groove 58. Radial alignment of the protection tube 24 relative to the casing 29 then takes place by pushing the centering spigot 64 into the recess 65. The screws 55 of the clamps 54 can subsequently be sufficiently tightened for the protrusions 56 to clamp the protection tube 24 against the casing 29 via the ring 60.

Universal connections 53 of this type are also allocated to the outlet openings 37, 38 and 39 for fastening a process adaptor 28 to the process optics 25. All the universal connections 53 at the inlet opening 36 and the outlet openings 37, 38 and 39 are preferably provided with approximately the same dimensions.

In this embodiment example, each of the covers 33 and 34 are also connected to the casing 29 by means of a universal connection 66. The latter corresponds in principle to the construction of the universal connections 53 for the protection tube 24 and the process adaptors 28. Two clamps 67, in each case, are again, in this case, each attached by one screw 68 to one of the end surfaces 31 or 32 of the casing 29, the clamps 67 being opposite to one another in a diagonal of the end surfaces 31 or 32. The covers 33 and 34 have four groove segments 69 to engage with the clamp 67. The groove segments 69 are manufactured by straight milling into the envelope of the circular covers 33 and 34. The arrangement of the groove segments 69 is such that two groove segments 69, in each case, are located opposite one another as a pair and the two pairs of opposite groove segments 69 are displaced by 90° relative to one another. The covers 33 and 34 can, by this means, be screwed to the process optics 25 in a position relative to one another which is displaced by 90° at a time with respect to the longitudinal axis 42. By means of such a rotation, in particular of the cover 34, relative to the casing 29, the focusing mirror 45 can be allocated alternatively to the (bottom) outlet opening 37 or one of the two (side) outlet openings 38 or 39 according to the processing to be carried out. The universal connections 66 of each of the covers 33 and 34 also exhibit radial centering by means of a cylindrical spigot 70 located on the inner end surface of the covers 33 and 34, which cylindrical spigot 70 penetrates through the end surfaces 31 and 32 into the through hole 30 of the casing 29 in order to radially centre the deflection mirror 44 and the focusing mirror 45 in the process optics 25. For this purpose, the cylindrical spigots 70 have dimensions matched to the through hole 30.

In addition to the radial centering, an antirotation device is provided for the universal connections 66. As shown in FIG. 2, two opposite ball catches 71 are located in each of the covers 33 and 34 to secure the covers 33 and 34 against rotation relative to the end surfaces 31 and 32, respectively, of the casing 29. The ball catches are located in the edge regions of the covers 33 and 34 and are, as is again shown in FIG. 3, located in those regions left by the groove segments 69.

Figure 7:
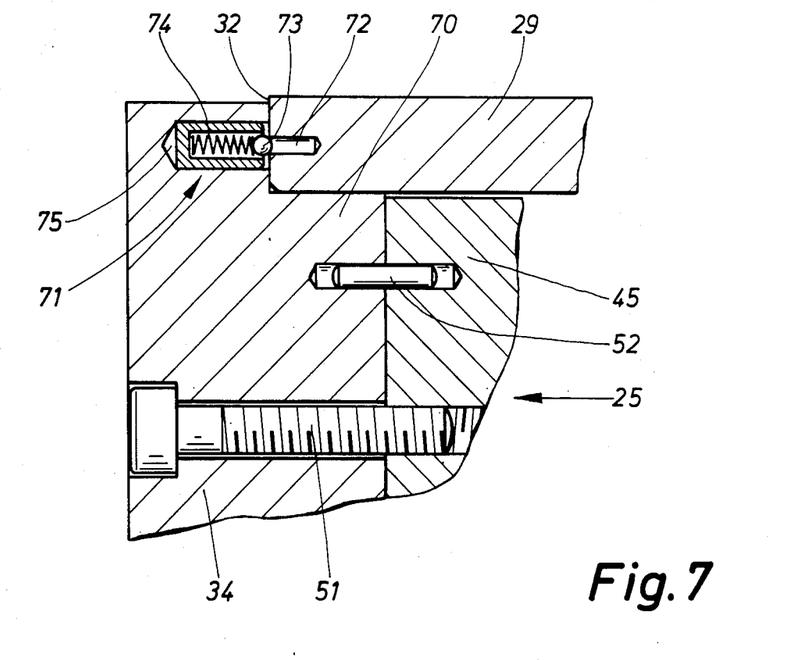
FIG. 7 shows a detail VII, from FIG. 2, of a ball catch, to an increased scale.

FIG. 7 shows the construction of a ball catch 71, or anti-rotation device, to an enlarged scale. In this, the ball catch 71 is inserted in a blind hole 72 located in the cover 34. On the side directed towards the end surface 32 of the casing 29, the ball catch 71 has a ball 73 which is pressed by means of a compression spring 74 against the end surface 32. The ball catch 71 is pushed sufficiently far into the blind hole 72 that the ball 73 protrudes partly relative to the surface of the cover 34 in contact with the end surface 32 of the casing 29. The protruding part of the ball 73 of the ball catch 71 is then in engagement with a blind hole 75 located in the end surface 32. The blind hole 75 is of smaller dimensions than the blind hole 72 of the ball catch 71 in such a way that the envelope of the ball 73 makes full surface contact with the upper edge of the (small) blind hole 75. By this means, the cover 34 is positively centered relative to the casing 29.

The two ball catches 71 in the cover 34 are, in this case, allocated to a total of four (small) blind holes 75 located in the casing 29. The four blind holes 75 are evenly distributed over the end surface 32 and thus have a displacement of 90°, in each case, relative to one another, the ball catches 71 in the cover 34 being allocated, in each case, to two opposite blind holes 75. The other two blind holes 75 are used for centering the cover 34 when the latter is rotated, together with the focusing mirror 45, by 90° about the longitudinal axis 42 of the casing 29. This makes it possible to exactly allocate the focusing mirror 45 to one of the three outlet openings 37, 38 and 39, displaced relative to one another by 90° in each case, in the process optics 25 because the two ball catches 71 engage alternatively in two of the (small) blind holes 75 on each 90° displacement.

In the end surface 31 of the casing 29 directed towards the cover 33, on the other hand, it is only necessary to provide two (small) blind holes 75, in this embodiment example, because the deflection mirror 44 only has to be secured against rotation in one single, defined position.

Figure 4:
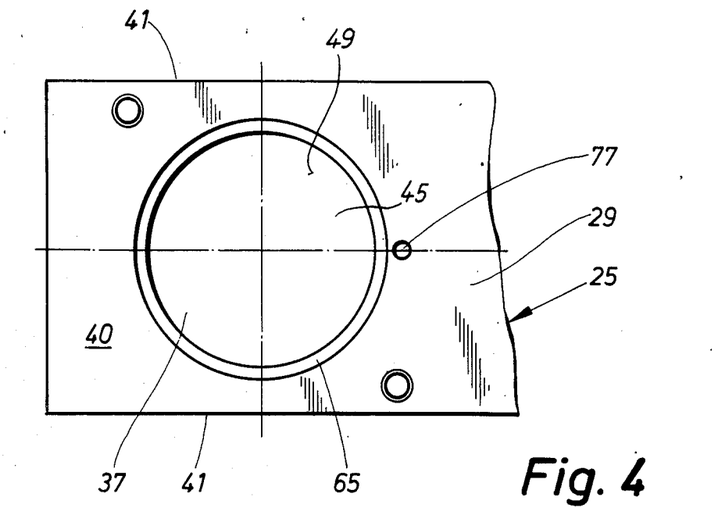
FIG. 4 shows a partial bottom view under the process optics in the region of an unclosed opening in the casing.

The protection tube 24 and the process adaptors 28 can be secured against rotation relative to the process optics 25 in the same manner, i.e. also by ball catches 76 associated with the universal connections 53. In the present embodiment example, the universal connections 43—in contrast to the covers 33, 34—only have one ball catch 76 each, as shown in FIG. 4. In this case, the ball catch 76 is located in the casing 29 while a (small) blind hole 77 interacting with the ball catch 76 is located in the collar 62 directed towards the lower wall 40 of the casing 29. Since the process adaptors 28 are generally connected at the same position to the process optics 25, only one (small) blind hole 77 is allocated, in this case, to each ball catch 76 of the universal connection 53. It is therefore possible to change a process adaptor 28 which has already been initially adjusted without having to readjust it. The protection tube 24 can be similarly secured against rotation relative to the process optics 25 by means of a ball catch 76.

Figure 11:
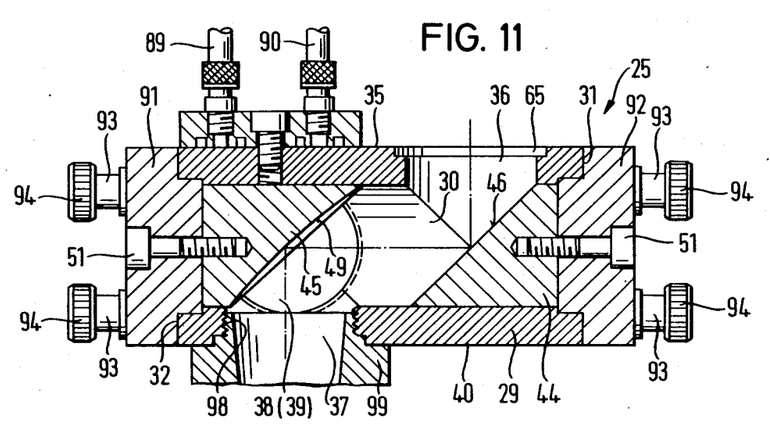
FIG. 11 shows a fifth embodiment example of a process head in vertical longitudinal section.
Figure 12:
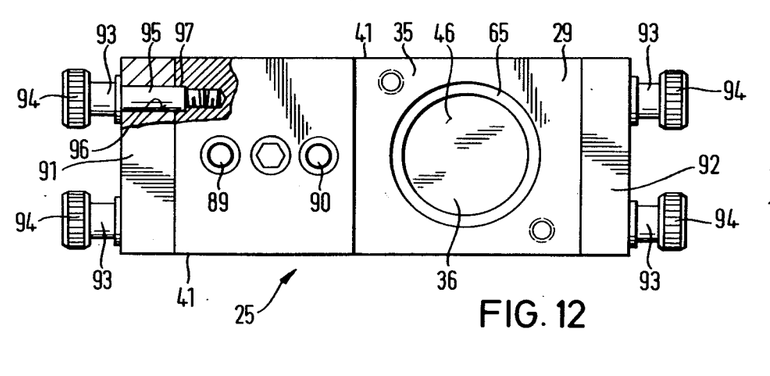
FIG. 12 shows a process head as shown in FIG. 11 in a view from above.

FIGS. 11 and 12 show a different (alternative) fastening of the covers 91, 92 to the casing 29 of the process optics 25. In these drawings, the covers 91, 92 are each screwed to the casing 29 by means of two diagonally opposite knurled fitted screws 93. Fastening and releasing the covers 91, 92 by hand—i.e. without tools—is possible by means of a knob-type design of knurled head 94. A central, cylindrical centering part 95 on the knurled fitted screws 93, which enters into a corresponding through hole 96 in the covers 91, 92, and a centering bore 97 in the casing 29, serve to adjust the covers 91, 92 relative to the casing 29 of the process optics 25. This ensures that the mirrors (deflection mirror 44; focusing mirror 45) reassume approximately the same position after each removal of the covers 91, 92.

Each cover 91, 92 has a total of four symmetrically located and equally large through holes 96. This makes it possible to fit the covers 91, 92 in four different relative positions, displaced by 90° in each case, on the casing 29.

As a further special feature, this embodiment example has an internal thread 98, in the lower outlet opening 37 of the casing 29, for fastening a process adaptor 99. In this embodiment example, the adaptor 99 can, by this means, be simply screwed to the casing 29 by hand—i.e. without any tools—without the clamps 54 of a universal connection 53.

The free outlet openings, for example the side outlet openings 38 and 39 in FIG. 3, are closed by a blind flange 78. For reasons of simplicity, the outlet openings are not connected to the casing 29 by means of a universal connection 53 in the present embodiment examples but are screwed to the casing 29 by means of two opposite screws 79. The hole pattern for the screws in the blind flange 78 is so selected that the threaded holes used for fastening the clamps 54 to the casing 29 can be used after the clamps 54 have been previously unscrewed.

Figure 9:
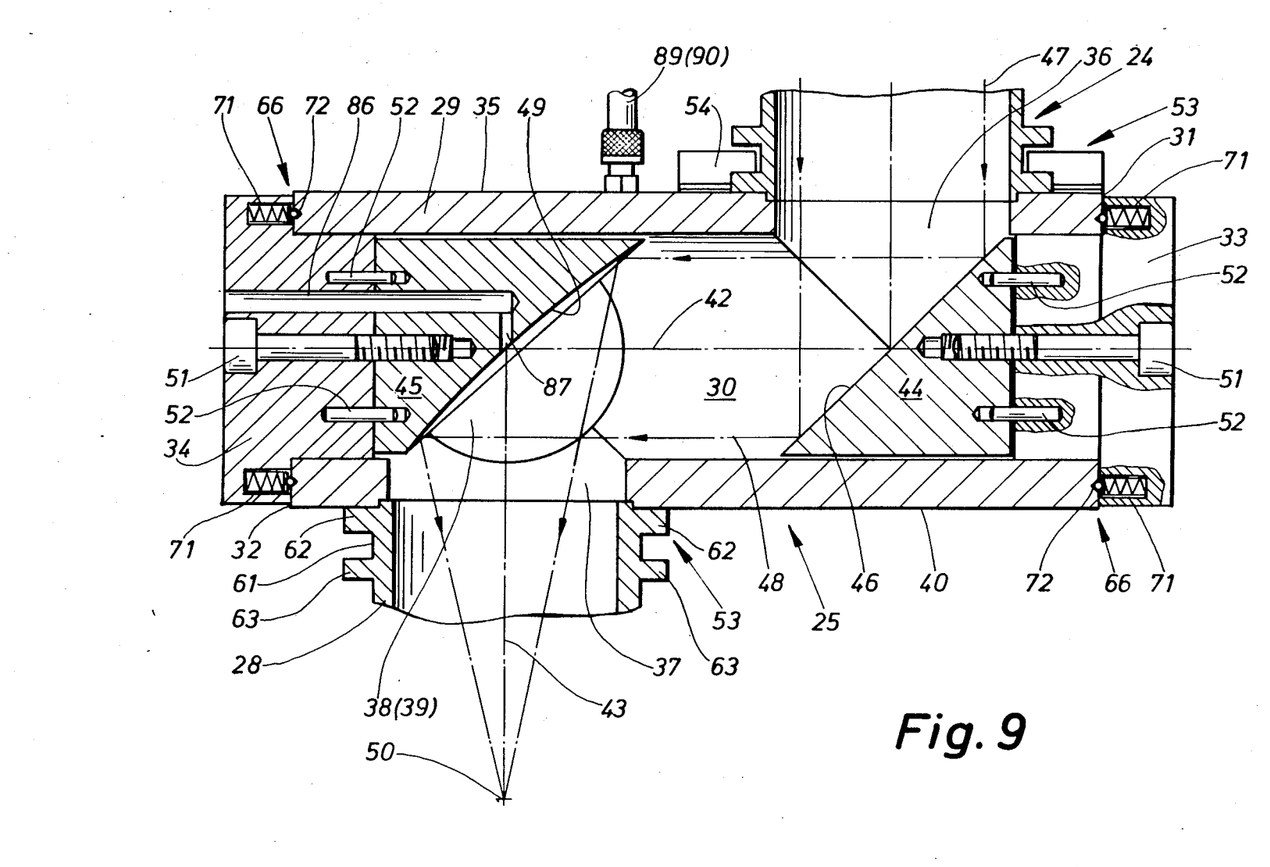
FIG. 9 shows a third embodiment example of a process optics system as shown in FIG. 2 with a hole for an endoscope.
Figure 10:
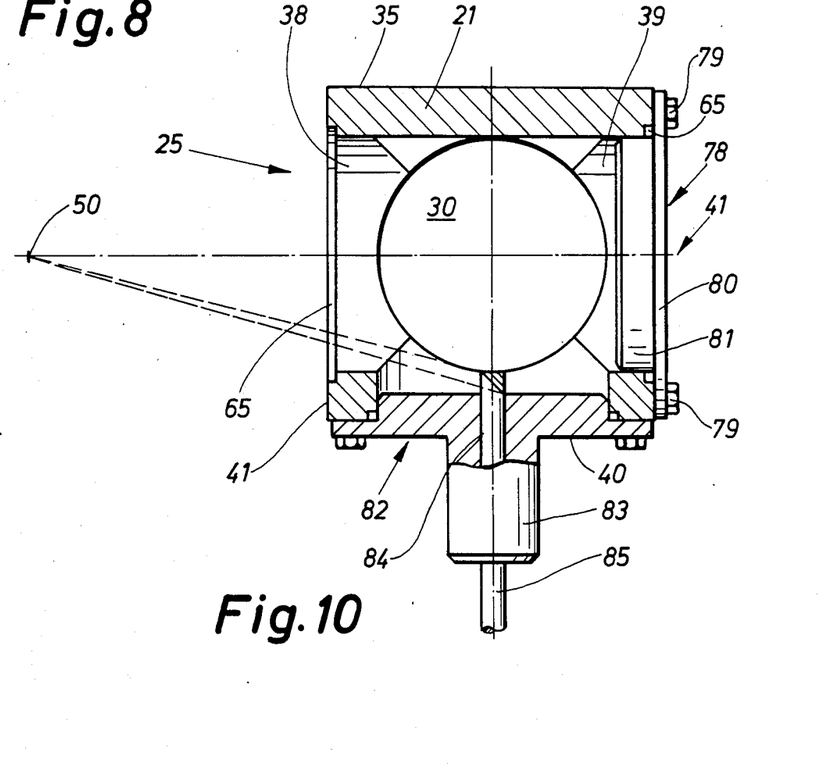
FIG. 10 shows a fourth embodiment example of a process optics head in the representation shown in FIG. 9, but with side openings, closed by a cover and a reception cover for an endoscope, in the, casing.

FIG. 9 shows a further embodiment example for the location of an endoscope in the process optics 25. In this case, a reception hole 86 for an endoscope (not shown) is horizontally and eccentrically located in the cover 34. The reception hole 86 ends as a blind hole shortly before the reflection surface 49 of the focusing mirror 45. Shortly before the end of the reception hole 86, a vertical and smaller observation hole 87 branches off from the reception hole 86 and is, in fact, located on the longitudinal central axis 43 of the focused laser beam 26. The diameter of the observation hole 87 is a relatively small dimension, for example 2 mm, so that the area of the reflection surface 49 is only slightly reduced and hence no noticeable loss of power in the laser beam is caused. Using an optical observation instrument located in this manner, it is—for example—possible to carry out initial positioning of a process adaptor 28 relative to the casing 29 when the laser is switched off. Similarly, the process adaptor 28 can be positioned by this means over a particular point on the workpiece 27.

Figure 8:
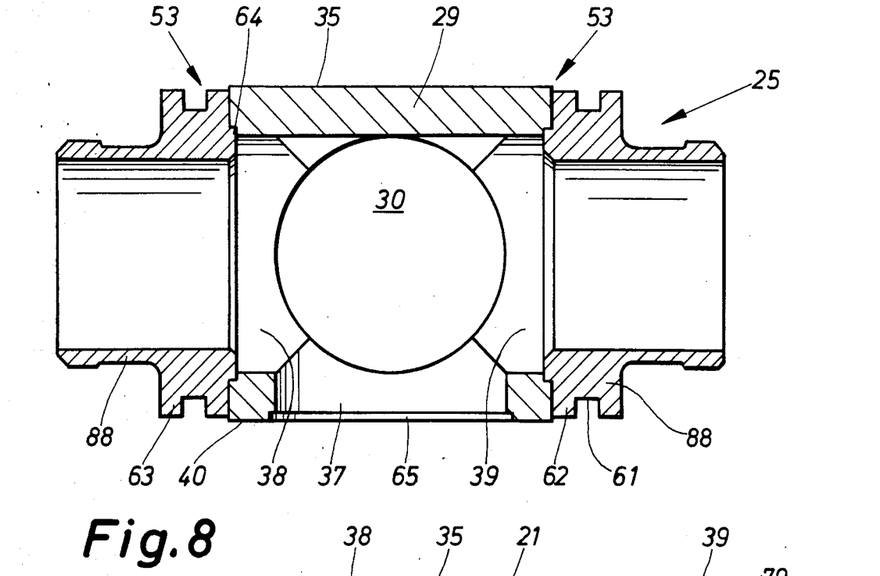
FIG. 8 shows a second embodiment example of a process optics system in cross-section in the plane of the outlet openings through two opposite suction connections.

Finally, FIG. 8 shows a further embodiment example of the invention in which a suction connection 88 is fastened to the casing by means of a universal connection 53 at each of the two unoccupied (side) outlet openings 38 and 39. The suction connections 88 are connected to a gas supply and act to extract, from the internals of the process optics 25, dust, smoke or the like entering through the process adaptor 28 during operation, in order to protect the reflection surfaces 46 and 49 of the mirrors. Alternatively, protective gas or a cooling gas can also be blown into the internals of the process optics 25 through the suction connections 88. It is also conceivable to use the opposite suction connections 88 as the gas inlet and gas outlet, thus causing a horizontally directed gas flow in the process optics 25, this gas flow forming a "gas barrier" against dust, smoke, etc. penetrating into the process optics 25.

The deflection mirror 44 and the focusing mirror 45 in the devices of the embodiment examples described are manufactured from copper. The effect of this is that the mirrors scarcely change their shape due to thermal loading during the processing operations, so that no readjustment is required.

The reflection surfaces 46 and 49 of the copper mirrors are either highly polished or produced by vapour deposition, in particular by sputtering.

FIGS. 2 and 3 also show two connections on the upper wall 35 of the casing 29, i.e. a coolant inlet 89 and a coolant outlet 90. By means of these connections, a coolant circuit, not shown in the figure and composed of holes located in the walls of the casing 29, can be supplied and evacuated. If required, the cooling holes in the process optics 25 can also extend over one or more of the covers 33 and 34. The end surfaces between the casing 29, on the one hand, and the covers 33 and 34, on the other, then have to be provided with suitable seals.

We claim:

1. Device for processing workpieces by means of an energy beam of high power density, in particular a laser beam from a $CO_2$ laser, having process optics for deflecting or reshaping the laser beam, with which process optics is associated a connecting element to the $CO_2$ laser and a process adaptor corresponding to the process to be carried out, the process optics having a casing with at least one inlet opening and at least one outlet opening for the laser beam and optical elements, preferably a deflection mirror and a focusing mirror, located within the same casing, characterised in that a universal connection (53) is associated with at least the outlet opening (37, 38, 39) in the casing (29) for alternative connection of the process optics (25) to the corresponding process adaptors (28), and in that an approximately similar design of universal connection (53) is allocated to each of the outlet openings (37, 38, 39) and that inlet opening (36) for the laser beam into the casing (29).

2. Device for processing workpieces by means of an energy beam of high power density, in particular a laser beam from a $CO_2$ laser, having process optics for deflecting or reshaping the laser beam, with which process optics is associated a connecting element to the $CO_2$ laser and a process adaptor corresponding to the process to be carried out, the process optics having a casing with at least one inlet opening and at least one outlet opening for the laser beam and optical elements, preferably a deflection mirror and a focuing mirror, located within the same casing, characterised in that a universal connection (53) is associated with at least the outlet opening (37, 38, 39) in the casing (29) for alternative connection of the process optics (25) to the corresponding process adaptors (28), and in that for a casing (29) with open ends (31, 32) closed by covers (33, 34), one universal connection (66) each is associated with each cover (33 and 34) on the casing (29).

3. Device as claimed in claim 2, characterised in that each universal connection (53, 66) has a set of clamps (54, 67) located externally on the casing (29) and at least one groove (annular groove 58; groove segment 69), designed to correspond to the clamps, on the process adaptor (28), a protective tube (24) and the cover (33, 34).

4. Device according to claim 3, characterised in that a set of two opposite clamps (54, 67) is located in the edge region of the inlet opening (36), of the outlet openings (37, 38, 39) or of the ends (31, 32) of the casing (29).

5. Device according to claim 3, characterised in that the clamps (54, 67) can be screwed onto the casing (29) from the outside.

6. Device according to claim 3, characterised in that the clamps (54, 67) are designed L-shaped, with a correspondingly designed protrusion (56) engaging in the groove (annular groove 58; groove segment 69) of the process adaptors (28), the protective tube (24) and the covers (33, 34).

7. Device according to claim 6, characterised in that one similarly dimensioned peripheral annular groove (58) is located on both the process adaptors (28) and on the protective tube (24) for engagement with the protrusions (56) of the clamps (54).

8. Device according to claim 7, characterised in that the annular groove (58) in the end region of the process adaptors (28) and of the protective tube (24) is formed by two annular collars (62 and 63) located at a distance from one another on the periphery of the process adaptors and the protective tube, the annular groove having dimensions corresponding to the clamps (54) and to the protrusions (56) located on them.

9. Device according to claim 3, characterised in that groove segments (69) are located on the covers (33, 34) and are composed preferably of four straight milling cuts in the (round) covers (33, 34) which lie opposite one another with pairs of groove segments (69) displaced by approximately 90° relative to one another.

10. Device according to claim 2, characterised in that the universal connections (59, 66) for the process adaptors (28), etc. and/or the covers (33, 34) have a radial centering element (centering spigot 64; cylindrical spigot 70).

11. Device according to claim 10, characterised in that the process adaptors (28) and the protective tube (24) have a cylindrical centering spigot (64) on an end surface directed towards the casing (29), a complementary design of recess (65) on the upper edge of the inlet opening (36) and the outlet opening (37, 38, 39) being associated with the spigot (64).

12. Device according to claim 10, characterised in that the cover (33, 34) has a cylindrical spigot (70), engaging in a through hole (30) in the casing (29) and designed to correspond to the hole, for centering the process optics (25) mirrors (focusing mirror 45; deflection mirror 44) located in the covers (33, 34).

13. Device according to claim 2, characterised in that the universal connections (53, 66) have an anti-rotation device for positioning the process adaptors (28), the protective tube (24) and/or the covers (33, 34), together with the mirrors (deflection mirror 44; focusing mirror 45), relative to the process optics (25).

14. Device according to claim 13, characterised in that the anti-rotation device on each universal connection (53, 66) consists of at least one (sprung) ball catch (71, 76).

15. Device according to claim 13, characterised in that with each ball catch (71, 76) in the process adaptor (28) and cover (33, 34) to be secured is associated a blind hole (75, 77) in the part (casing 29, process adaptor 28 and cover 33, 34) opposite to the ball catch (71, 76), in which blind hole a spring-loaded ball (73) of the ball catch (71, 76) engages with partial positive engagement in order to position the process adaptors (28) and covers (33, 34) in a (rotational) position, which is adjusted only once.

16. Device according to claim 14, characterised in that two opposite ball catches (71), with two correspondingly positioned blind holes (75) in the casing (29) for each possible (rotational) position of the cover (33, 34) and of the mirrors (deflection mirror 44; focusing mirror 45), are located in each cover (33, 34).

17. Device according to claim 14, characterised in that with each universal connection (53) for the process adaptors (28) and the protective tube (24) is associated at least one ball catch (76) located in the casing (29), together with at least one blind hole (77), opposite to the ball catch (76), in the process adaptors (28) and the protective tube (24).

18. Device according to claim 12, characterised in that three approximately equally sized outlet openings (37, 38, 39), displaced by 90° relative to one another, are located in the casing (29), lying preferably in a common (vertical) plane at right angles to a longitudinal axis (42) of the casing (29).

19. Device according to claim 18, characterised in that a suction connection (88) with a universal connection (53) is connected to at least one free outlet opening (37, 38 and 39) of the casing (29) in order to remove dust, smoke or the like by suction from the process optics (25).

20. Device according to claim 18, characterised in that a blind flange (82) with a reception hole (84) for an optical observation instrument (endoscope 85) is connected to one free outlet opening (37, 38 and 39) in the casing (29) by means of a universal connection (53).

21. Device according to claim 2, characterised in that a reception hole (36) for an optical observation instrument (endoscope 85) is located in the cover (33, 34), in particular in the cover (34) carrying the focusing mirror (45), in such a way that the reception hole (86) and an observation hole (87) associated with it emerges in the centre of a reflection surface (49) of the focusing mirror (45).

* * * * *